US009430683B1

(12) United States Patent
Hyde

(10) Patent No.: US 9,430,683 B1
(45) Date of Patent: Aug. 30, 2016

(54) PASSIVE SELF-JAMMER CANCELLATION IN RFID SYSTEMS

(71) Applicant: Impinj, Inc., Seattle, WA (US)

(72) Inventor: John D Hyde, Corvallis, OR (US)

(73) Assignee: IMPINJ, INC., Seattle, WA (US)

( * ) Notice: Subject to any disclaimer, the term of this patent is extended or adjusted under 35 U.S.C. 154(b) by 0 days.

(21) Appl. No.: 14/741,366

(22) Filed: Jun. 16, 2015

Related U.S. Application Data

(60) Provisional application No. 62/013,983, filed on Jun. 18, 2014.

(51) Int. Cl.
*G06K 7/10* (2006.01)
*G06K 19/073* (2006.01)

(52) U.S. Cl.
CPC ....... *G06K 7/10019* (2013.01); *G06K 7/10386* (2013.01); *G06K 19/07318* (2013.01)

(58) Field of Classification Search
CPC ............... G06K 7/10019; G06K 19/07318; G06K 19/07336; G06K 7/10386
See application file for complete search history.

(56) References Cited

U.S. PATENT DOCUMENTS

| 6,384,680 B1 * | 5/2002 | Takei ...................... H03F 3/602 330/124 R |
| 2011/0176636 A1 * | 7/2011 | Wang ..................... H04L 27/36 375/302 |

\* cited by examiner

*Primary Examiner* — Leon-Viet Nguyen
(74) *Attorney, Agent, or Firm* — Turk IP Law, LLC

(57) ABSTRACT

A self-jammer-cancellation circuit in an RFID system uses passive variable capacitance networks to attenuate phase-adjusted carrier signals, which are then combined with a received signal to reduce unwanted carrier signals in the received signal. The self-jammer-cancellation circuit also adjusts the passive variable capacitance networks such that the overall capacitance of each network remains constant or the overall relationship of capacitances between the networks remains constant.

20 Claims, 17 Drawing Sheets

PASSIVE SELF-JAMMER CANCELLATION IN RFID SYSTEMS

CROSS REFERENCE TO RELATED APPLICATIONS

This application claims the benefit of U.S. Provisional Patent Application Ser. No. 62/013,983 filed on Jun. 18, 2014. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to reducing the amplitude of unwanted carrier signals or self-jammers in a received signal in RFID systems. A self-jammer-cancellation circuit uses passive variable capacitance networks to attenuate phase-adjusted carrier signals, which are then combined with a received signal to reduce the amplitudes of unwanted carrier signals in the received signal. The self-jammer-cancellation circuit also adjusts the passive variable capacitance networks such that the overall capacitance of each network remains constant or the overall relationship of capacitances between the networks remains constant.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
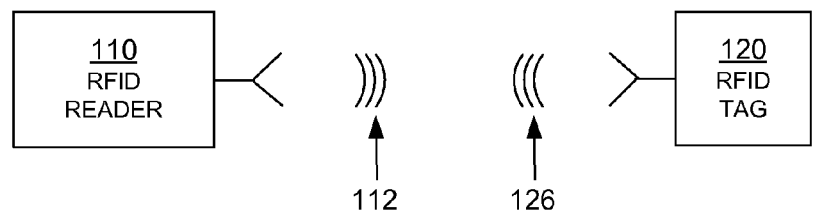
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
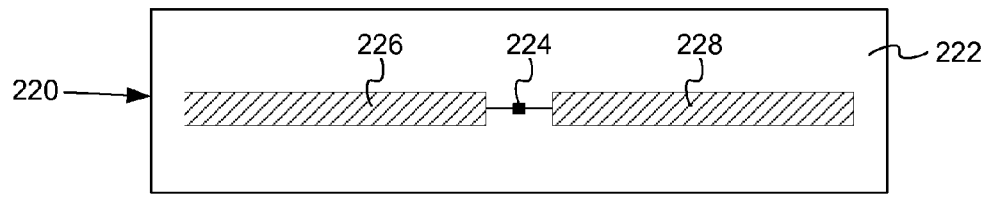
FIG. 2 is a diagram showing components of a passive RFID tag, such as a tag that can be used in the system of FIG. 1.
Figure 2:
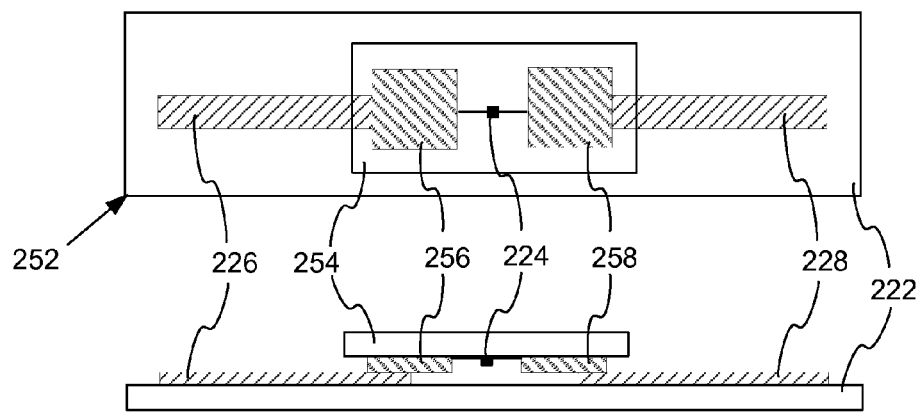
Figure 2:
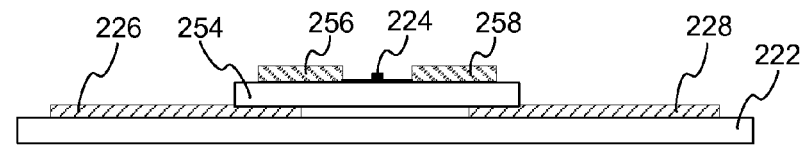

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
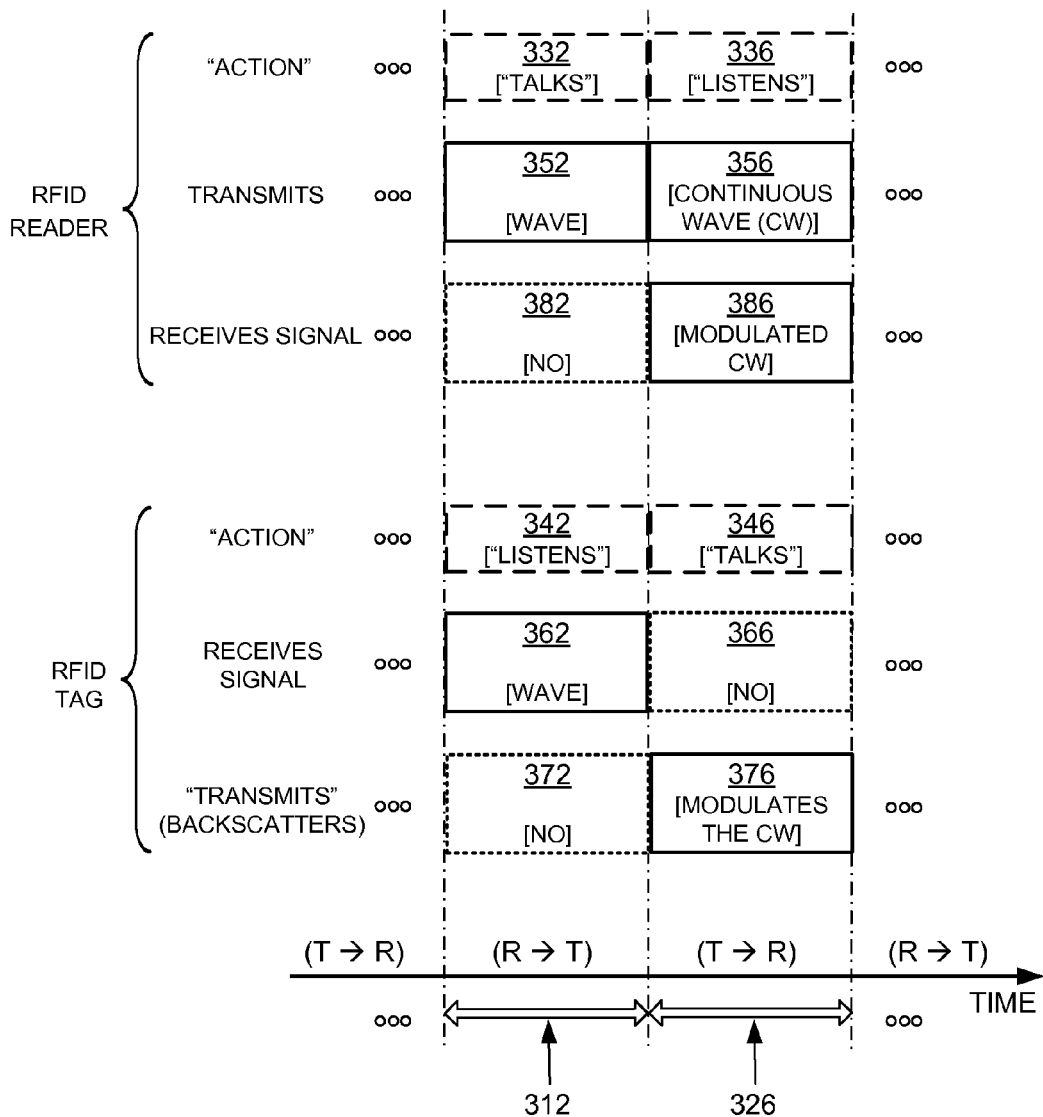
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
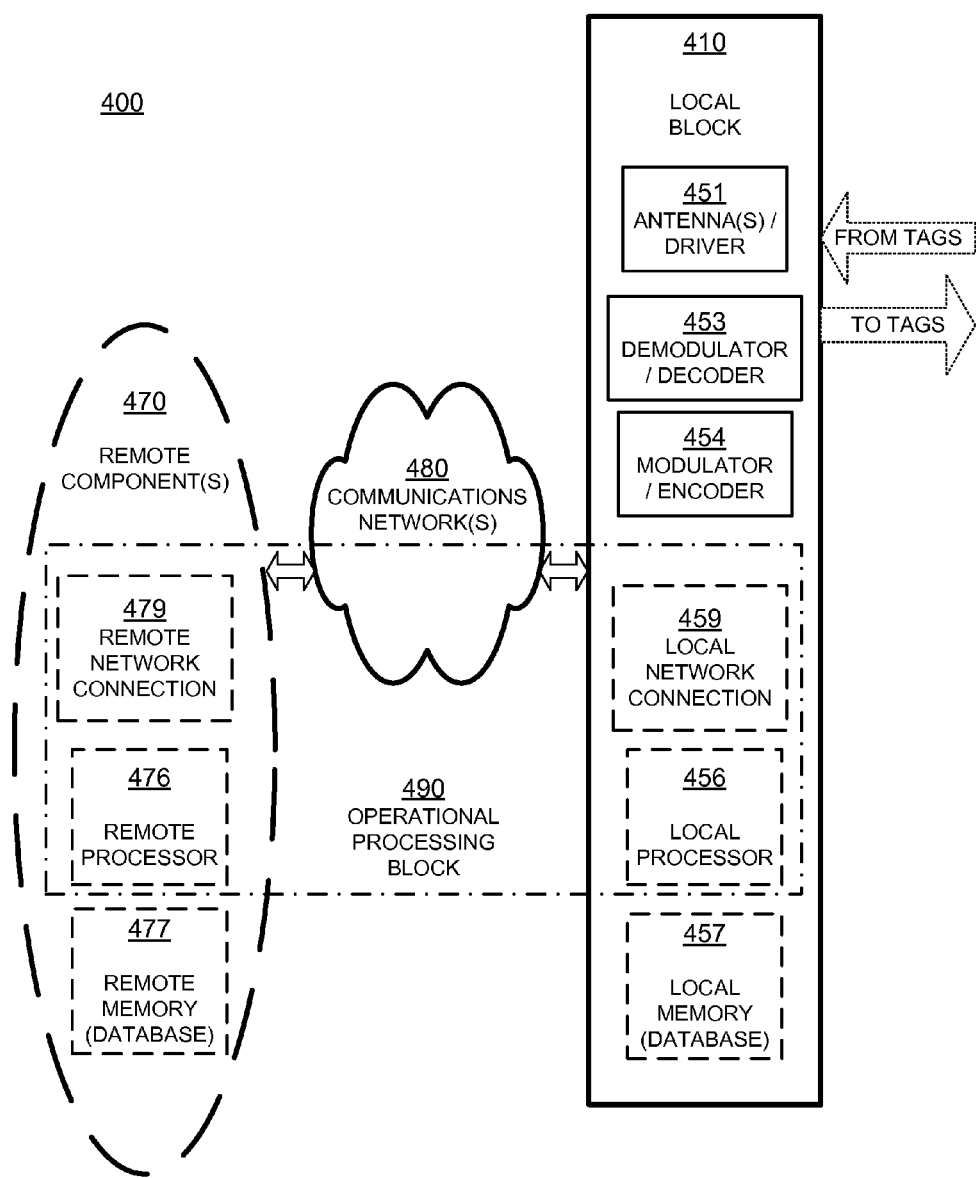
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

In some embodiments, one or more of the blocks or components of reader system 400 may be implemented as integrated circuits. For example, local block 410, one or more of the components of local block 410, and/or one or more of the remote component 470 may be implemented as integrated circuits using CMOS technology, BJT technology, MESFET technology, and/or any other suitable implementation technology.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Local memory 457 can be implemented separately from local processor 456, or in an IC with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to EPCs, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. Local block 410 may include a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an authentication function, similar to local processor 456.

Remote component(s) 470 can also include a remote memory 477. Remote memory 477 can be made in any way known in the art, such as was described with reference to local memory 457. Remote memory 477 may include a local database, and a different database of a standards organization, such as one that can reference EPCs. Remote memory 477 may also contain information associated with commands, tag profiles, keys, or the like, similar to local memory 457.

Of the above-described elements, it may be useful to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna/driver 451, and cause antenna/driver 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna/driver block 451, with modulator/encoder block 454 encoding and modulating the information on an RF wave. Then data is received from the tags via antenna/driver block 451, demodulated and decoded by demodulator/decoder block 453, and processed by operational processing block 490.

Embodiments of an RFID reader system can be implemented as hardware, software, firmware, or any combination. Such a system may be subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
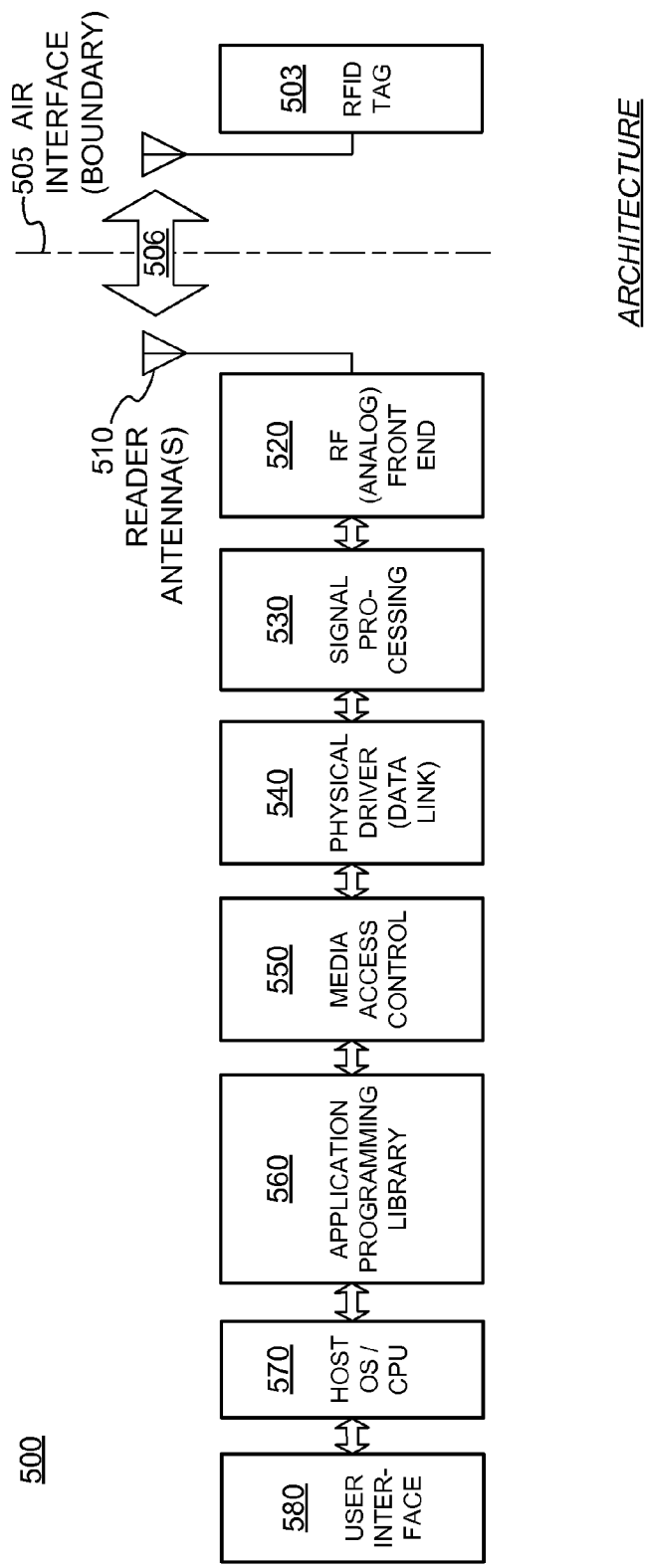
FIG. 5 is a block diagram illustrating an overall architecture of an RFID system according to embodiments.

FIG. 5 is a block diagram illustrating an overall architecture of an RFID system 500 according to embodiments. RFID system 500 may be subdivided into modules or components, each of which may be implemented by itself or in combination with others. In addition, some of them may be present more than once. Other embodiments may be equivalently subdivided into different modules. Some aspects of FIG. 5 are parallel with systems, modules, and components described previously.

An RFID tag 503 is considered here as a module by itself. RFID tag 503 conducts a wireless communication 506 with the remainder, via the air interface 505. Air interface 505 is really a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550. In one embodiment, media access control layer module 550 exchanges packets of bits with physical driver module 540. Media access control layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to self-jammer cancellation with passive components. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 6:
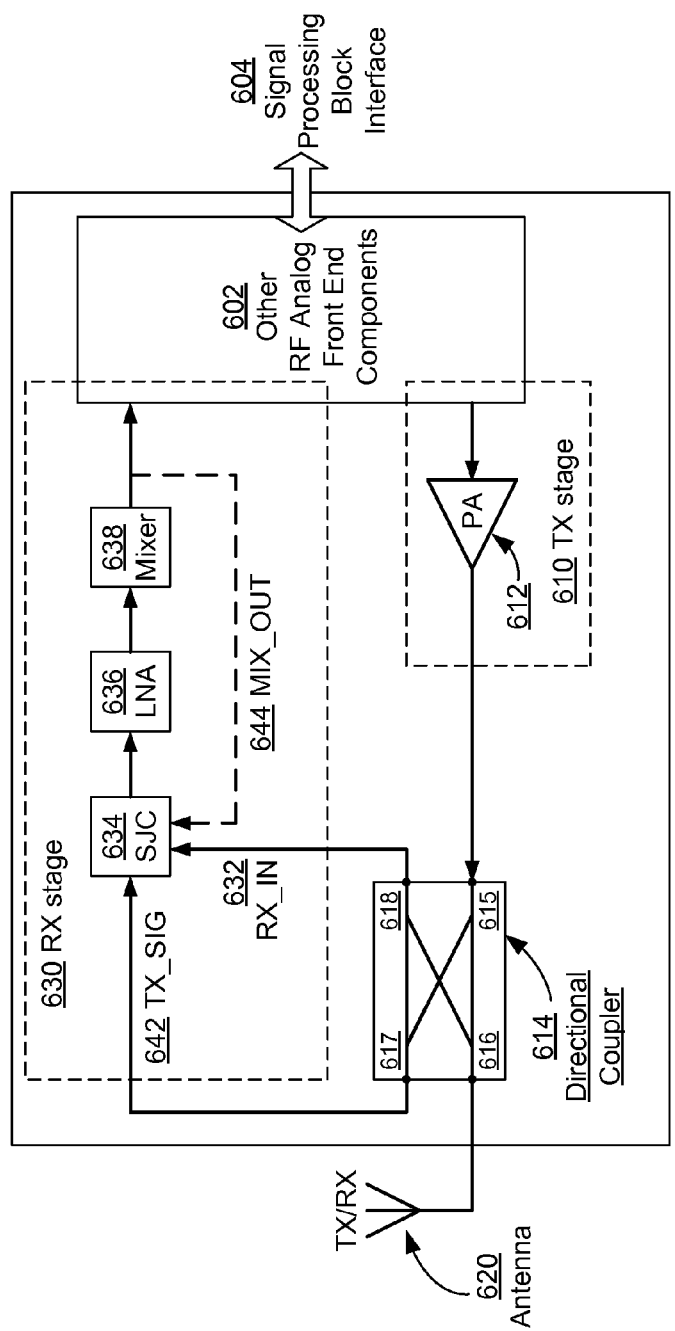
FIG. 6 illustrates an RFID reader RF analog front end 600 where self-jammer cancellation may be implemented.

FIG. 6 illustrates an RFID reader RF analog front end 600 where self-jammer cancellation methods may be implemented.

RF analog front end (RFE) 600 may include an antenna 620 coupled to transmit (TX) stage 610 and receive (RX) stage 630. TX stage 610 includes at least power amplifier (PA) 612, and in some embodiments may also include one or more additional components from other RF analog front end components 602. RX stage 630 may include self-jammer cancellation (SJC) module 634, low-noise amplifier (LNA) module 636, receive mixer module 638, and/or one or more additional components from components 602. Components 602 in turn may be coupled to signal processing block interface 604, which may be coupled to a signal processing block such as signal processing module 530. In some implementations PA 612 may be included in an integrated circuit that also may include RX stage 630 and/or other components. In other implementations all or part of PA 612 may be external to an integrated circuit that contains RX stage 630.

Antenna 620 may be coupled to TX stage 610 and RX stage 630 via directional coupler 614, which may act to isolate TX stage 610 from RX stage 630. Directional coupler 614 may be an RF device configured to conduct RF power between port 615 and port 616, and to couple reduced power from port 615 to port 617 and from port 616 to port 618. Port 618 is isolated from port 615 and port 617 is isolated from port 616. In many implementations directional coupler 614 may be external to an integrated circuit that also may include RX stage 630 and/or other components.

In RF analog front end 600, directional coupler 614 may couple the output of PA 612 to antenna 620 (connected via ports 615 and 616) while isolating the output of PA 612 from input signal RX_IN 632 of RX stage 630 (connected via port 618 which is isolated from port 615). In addition, directional coupler 614 may couple signals received from antenna 620 to input signal RX_IN 632 of RX stage 630 (coupled from port 616 to port 618).

As depicted in FIG. 3, a reader may transmit a continuous wave (CW) signal to one or more tags during tag-to-reader communications. The CW signal may provide a responding tag with operating power and may serve as a carrier signal for the tag to modulate with response data and backscatter to the reader. In situations where a single antenna is used for transmit and receive functionalities, as is the case for RF analog front end 600, some of the transmitted CW signal may be reflected from the antenna 620 back through directional coupler 614 to input signal RX_IN 632 of RX stage 630. As a result, RX stage 630 may receive an input signal RX_IN 632 formed from a combination of this reflected CW signal (referred to as a "self-jammer" or an "unwanted carrier signal" [UCS]) and one or more backscattered tag responses (referred to as "signals-of-interest" or SOI). In some situations, the UCS may be significantly stronger (in other words, have larger signal amplitude) than the SOI, and the amplitude of input signal RX_IN 632 may be dominated by the UCS amplitude. The UCS amplitude in turn limits the maximum gain that can be used by LNA 636 for amplifying RX_IN 632 without causing significant signal compression, thereby limiting the amplification of the SOI in RX_IN 632 and degrading receiver signal-to-noise ratio (SNR) and sensitivity compared to a UCS-free input signal. In some situations, the UCS may also introduce amplitude-modulated (AM) noise from the transmit path or TX stage 610.

In some embodiments, the effects of the UCS may be at least partially mitigated by attenuating the UCS amplitude using self-jammer cancellation (SJC). SJC may be performed by creating a replica of the UCS having substantially equal amplitude as the UCS and opposite in phase to the UCS and summing the replica with the input signal RX_IN 632. Since the replica and the UCS have substantially the same amplitude but opposite phase, they cancel each other, resulting in a signal that is substantially just the SOI, or at least a signal in which the amplitude ratio between the UCS and the SOI is substantially reduced compared to the original RX_IN 632.

In some embodiments, SJC module 634 may perform SJC using a received input signal RX_IN 632 and a transmitted signal TX_SIG 642. SJC module 634 may receive RX_IN 632 from antenna 620 via directional coupler 614 (port 618 coupled from port 616), and may receive TX_SIG 642 from PA 612 via directional coupler 614 (port 617 coupled from port 615). In some embodiments, SJC module 634 may also use a mixer signal MIX_OUT 644 received from mixer 638 for self-jammer cancellation. The signal output from SJC module 634, with reduced or eliminated UCS amplitude, may then be passed to LNA 636 for amplification, then passed on for subsequent processing at mixer 638, other RF analog front end components 602, and then through signal processing block interface 604.

Figure 7:
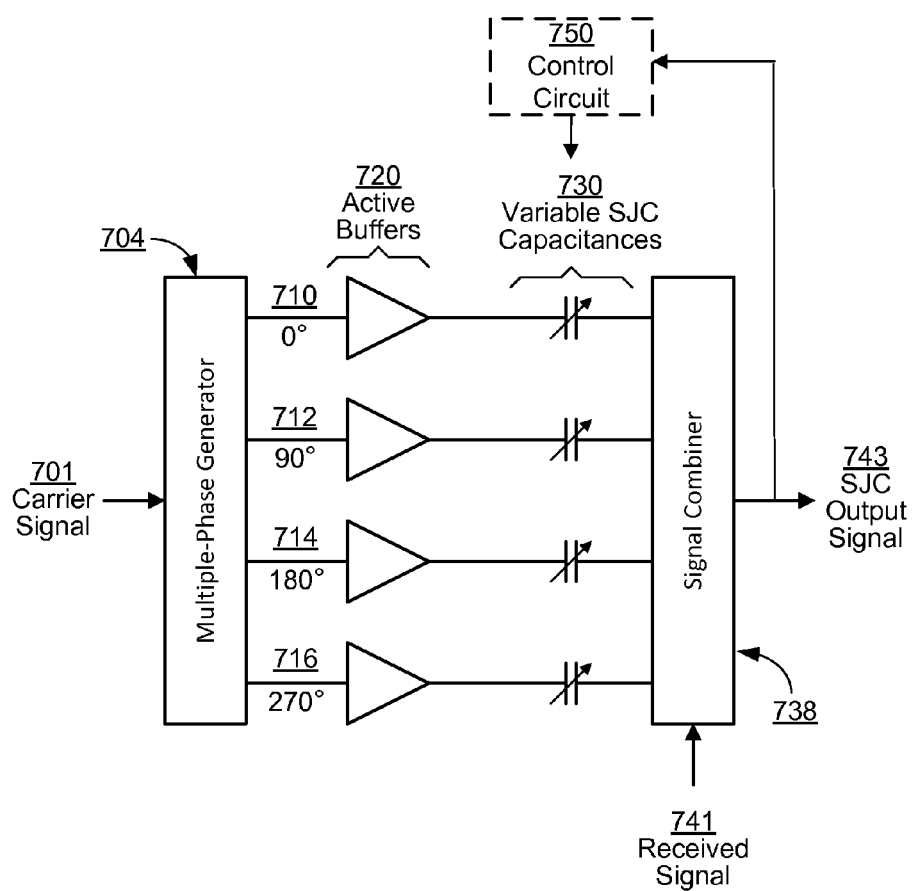
FIG. 7 is a diagram of a self-jammer-cancellation circuit with active buffers.

In some situations, SJC module 634 may be implemented using active buffers. FIG. 7 is a diagram of a self-jammer-cancellation (SJC) circuit 700 with active buffers. SJC circuit 700, similar to SJC module 634, may receive a carrier signal 701 (similar to TX_SIG 642) representing UCS or a self-jammer, and a received signal 741 (similar to RX_IN 532) that includes unwanted carrier signals and one or more signals-of-interest (SOIs) or backscattered tag responses, and output an SJC output signal 743. SJC circuit 700 may include a multiple-phase generator 704, multiple active buffers 720, multiple variable SJC capacitances 730, and a single-ended signal combiner 738. In some embodiments, SJC circuit 700 may include a control circuit 750, although in other embodiments control circuit 750 may be external to SJC circuit 700. Multiple-phase generator 704 may be configured to generate a number of different phase-adjusted reference carrier (PARC) signals 710-716 from carrier signal 701, where each PARC signal is offset from (i.e., leads or lags) carrier signal 701 by a different phase. The phase offset between the different PARC signals may be more important than the phase offset to carrier signal 701. For example, PARC signal 710 may be offset from carrier signal 701 by a phase that is used as a reference phase of 0° for the different PARC signals, PARC signal 712 may be offset from this reference phase by 90°, PARC signal 714 may be offset from the reference phase by 180°, and PARC signal 716 may be offset from the reference phase by 270°.

In some cases, multiple-phase generator 704 may require uniform load impedances on each of its outputs (that is, each of its outputs should see the same load impedance value) to assure that the PARC signals 710-716 have equally-spaced phase offsets. Accordingly, the outputs of multiple-phase generator 704 may be coupled to active buffers 720, where each of the PARC signals 710-716 are coupled into a respective active buffer in the active buffers 720. Active buffers 720 are configured to present uniform load impedances to the outputs of multiple-phase generator 704. In addition, active buffers 720 may also present relatively high impedances to the outputs of multiple-phase generator 704, which may reduce loss in SJC circuit 700 and increase the amount (i.e., amplitude) of the UCS that can be cancelled in SJC circuit 700.

The PARC signals output from active buffers 720 may then be coupled into variable SJC capacitances 730, where each distinct PARC signal is coupled into a different variable SJC capacitance. Variable SJC capacitances 730 may be configured to attenuate (i.e., reduce the amplitude of) the PARC signals in response to control signals from control circuit 750 in order to cancel UCS in received signal 741. The attenuated PARC signals output from variable SJC capacitances 730 may then be coupled into signal combiner 738. Signal combiner 738 may then combine the attenuated PARC signals with received signal 741 to cancel UCS present in received signal 741 and generate SJC output signal 743, which ideally only contains SOI but probably contains a reduced amount of UCS compared to received signal 741. SJC output signal 743 may then be sent to subsequent processing stages (e.g., LNA 636). In some embodiments, control circuit 750 may determine the quantity of residual UCS present in SJC output signal 743 to evaluate whether variable SJC capacitances 730 should be further adjusted (and how they should be adjusted) in order to decrease the amount of UCS in output signal 743.

As described above, active buffers 720 provide uniform and high load impedances, allowing multiple-phase generator 704 to provide equally-spaced output signals for SJC and increasing the amount of the UCS that can be cancelled. However, active buffers 720 consume significant power during operation, which may be undesirable for low-power SJC applications.

Figure 8:
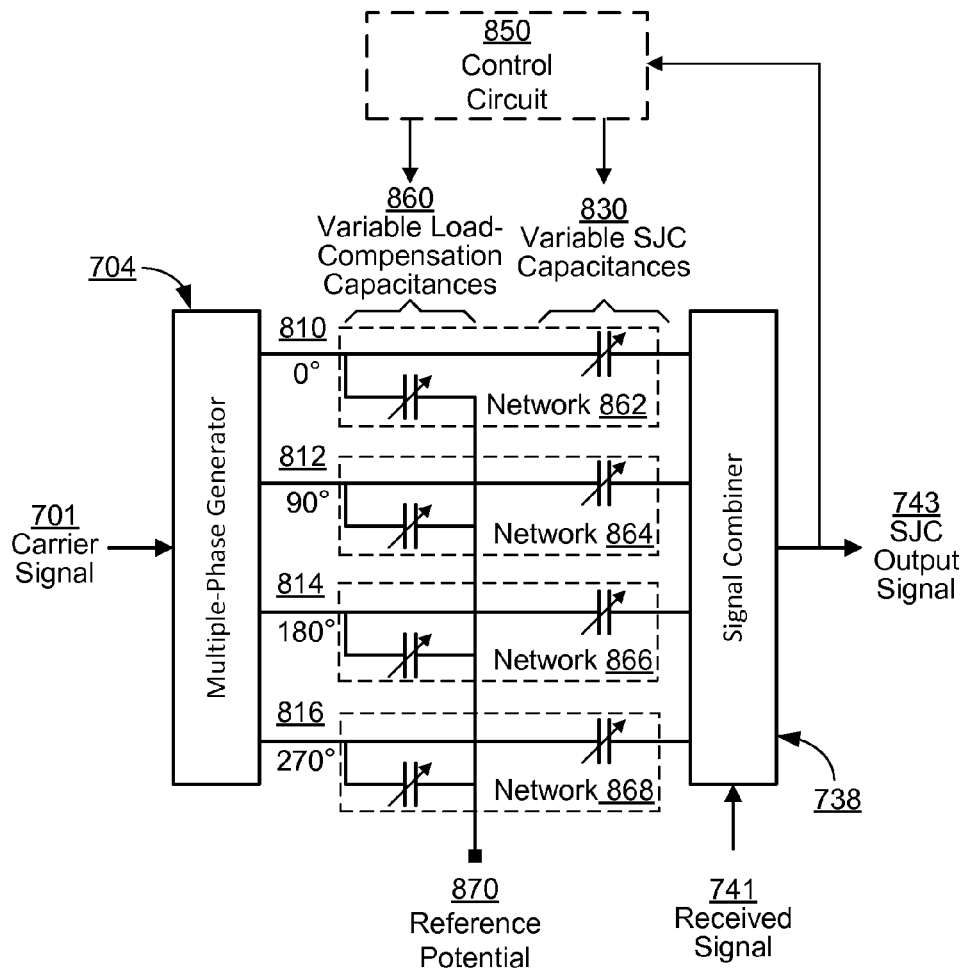
FIG. 8 is a diagram of a passive self-jammer-cancellation circuit with variable load-compensation capacitances, according to embodiments.

In some embodiments, power consumption of an SJC circuit may be reduced by replacing active buffers with passive components in an RF signal path. "Passive" in the context of this disclosure is defined as "not providing current or voltage gain in an RF signal path", but a "passive" element may consume some power. For example, passive components and devices may contain transistors and/or other "active" elements (i.e., devices that require power to function). These "active" elements may be used as signal switches and/or to perform digital logic operations. FIG. 8 is a diagram of a passive SJC circuit 800 with variable load-compensation capacitances, according to embodiments. SJC circuit 800 shares similarities with SJC circuit 700, with similarly-numbered elements behaving similarly. However, instead of including active buffers, SJC circuit 800 includes multiple variable load-compensation capacitances 860 configured to shunt or redirect a portion of a received signal. For example, each of the variable load-compensation capacitances 860 may have an input coupled to an output of multiple-phase generator 704 and an output coupled to a reference potential 870, and may be configured to shunt a portion of a signal received from multiple-phase generator 704 to reference potential 870.

In this disclosure, a reference potential is defined as a particular DC or RF voltage amplitude common to two or more signals, and a reference node is defined as a circuit node or connection point at which a reference potential exists. A reference potential or reference node may be a ground, an RF ground, or a virtual ground. A ground may be defined as either a reference potential or a reference node for measuring single-ended voltages. The voltage of single-ended signals, including RF signals, is defined and measured with respect to ground, whereas the voltage of differential signals is defined and measured between the two sides (+ and −) of the differential signal. An RF ground may be defined as either a reference potential or a reference node for measuring single-ended RF signals. An RF ground may have a non-zero DC voltage, but may have a low RF impedance to ground and a nearly zero RF voltage. A virtual ground may be defined as either a reference potential or a reference node having a nearly zero signal voltage due to circuit behavior, such as due to a control circuit or due to active feedback. A particular reference node may be a virtual ground at a single signal frequency or over a range of signal frequencies. In some embodiments, circuits in this disclosure described as being coupled to a reference potential may instead (or also) be coupled to a reference node, and may also be coupled to two or more separate, different reference nodes.

The inputs of each of the load-compensation capacitances 860 may also be coupled to the input of a respective variable SJC capacitance in the variable SJC capacitances 830, thereby forming a number of variable load-compensation-SJC capacitance networks 862-868. A variable capacitance network in this disclosure may be defined as one or more variable capacitances coupled between a multiple-phase generator (e.g., multiple-phase generator 704), a signal combiner (e.g., signal combiner 738), and optionally one or more other devices, components, or circuit nodes.

Each of the variable load-compensation-SJC capacitance networks 862-868 may be coupled to a respective output of multiple-phase generator 704 and a respective input of signal combiner 738, as depicted in FIG. 8. Control circuit 750 may be configured to adjust the overall impedance of each of the variable load-compensation-SJC capacitance networks 862-868 by adjusting or providing control signals to adjust both the variable SJC capacitances (for self-jammer-cancellation as described above) and the variable load-compensation capacitances 860.

As described above, a multiple-phase generator such as multiple-phase generator 704 may require uniform load impedances on each of its outputs to assure equally-spaced phase-shifted output signals. In some embodiments, control circuit 850, in the course of adjusting variable SJC capacitances 830 for self-jammer cancellation, may also adjust variable load-compensation capacitances 860 such that the impedances of each of the variable load-compensation-SJC capacitance networks 862-868 as presented to multiple-phase generator 704 are substantially uniform. In other words, when control circuit 850 adjusts a variable SJC capacitance in a particular variable load-compensation-SJC capacitance network for self-jammer cancellation, control circuit 850 may also adjust the variable load-compensation capacitance in the network so as to counteract any impedance change of the network.

For example, the phase and amplitude of the UCS in received signal 741 may be such that to reduce the UCS amplitude control circuit 850 must increase the variable SJC capacitance in network 862 and decrease the variable SJC capacitance in network 864. To maintain uniform load impedances for multiple-phase generator 704 control circuit 850 may then decrease the variable load-compensation capacitance in network 862 and increase the variable load-compensation capacitance in network 864. When the UCS in SJC output signal 743 is canceled the PARC signal inputs to the signal combiner may act as (present as) virtual grounds at the UCS frequency. Accordingly, when the UCS is cancelled an SJC capacitance with a particular value and connected to a signal combiner input acting as a virtual ground may present the same load impedance as a load-compensation capacitance having the same value and connected to ground, an RF ground, or a virtual ground.

Figure 9:
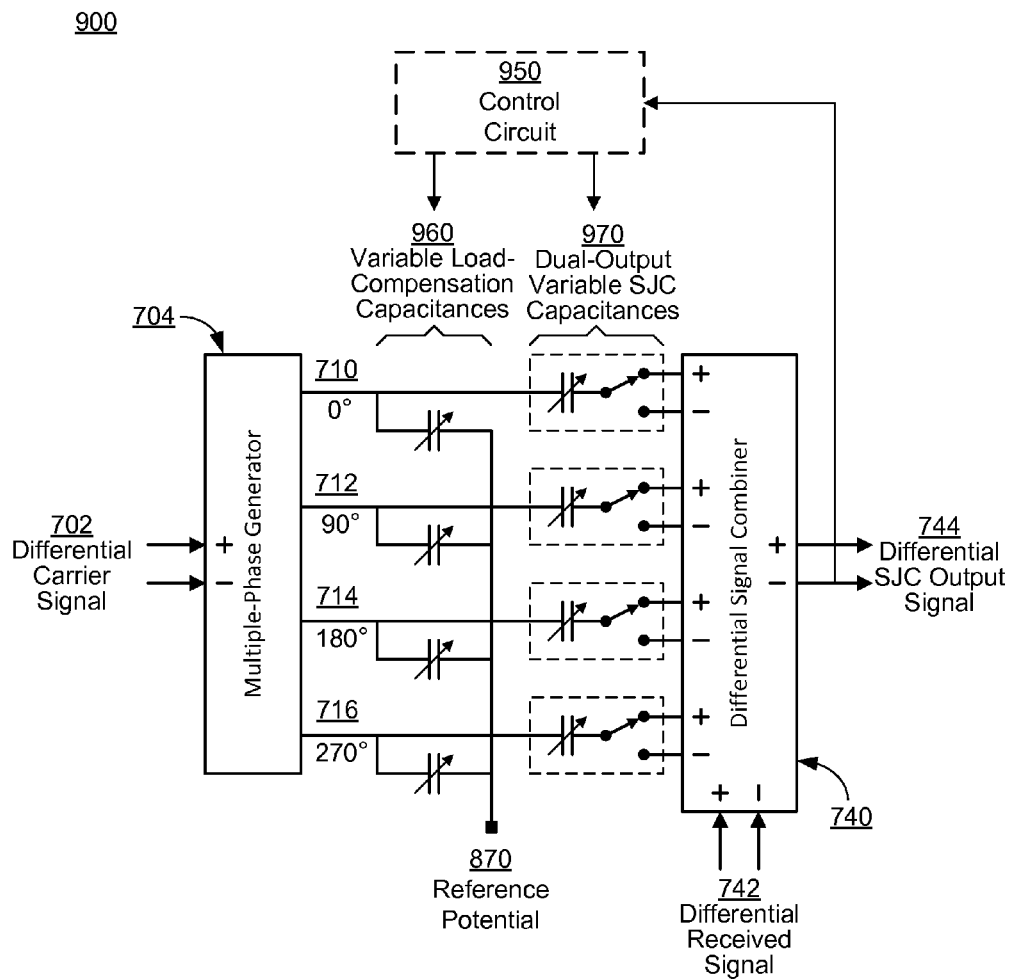
FIG. 9 is a diagram of a passive self-jammer-cancellation circuit with variable load-compensation capacitances and differential interfaces, according to embodiments.

FIG. 9 is a diagram of a passive self-jammer-cancellation (SJC) circuit 900 with variable load-compensation capacitances and differential interfaces, according to embodiments. SJC circuit 900 is similar to SJC circuit 800, with similarly-numbered elements behaving similarly, but modified to accept and output differential signals, which may reduce noise in some implementations. In particular, SJC circuit 900 may accept a differential carrier signal 702 and a differential received signal 742, and may output a differential SJC output signal 744. The differential signals 702, 742, and 744 may be similar to their single-ended counterparts 701, 741, and 743. Differently from SJC circuit 800, SJC circuit 900 has variable capacitance networks that include dual-output variable SJC capacitances 970 configured to output attenuated versions of PARC signals 710-716 to either side (+ or −) of the differential PARC signal inputs to differential signal combiner 740. Each of the dual-output variable SJC capacitances 970 have an input coupled to both a corresponding output of multiple phase generator 704 and a corresponding one of the variable load-compensation capacitances 960, and dual outputs coupled to a differential signal combiner 740. Control circuit 950, which may be part of SJC circuit 900 or external to SJC circuit 900, provides control signals to variable load-compensation capacitances 960 and dual-output variable SJC capacitances 970 in order to maintain substantially uniform load impedances on the outputs of multiple-phase generator 904, as described above. In some embodiments, control circuit 950 may also control the output behavior of the dual-output variable SJC capacitances 970. For example, control circuit 950 may control switches in one or more of the dual-output variable SJC capacitances 970 to cause the dual-output variable SJC capacitances 970 to switch between different outputs.

Figure 10:
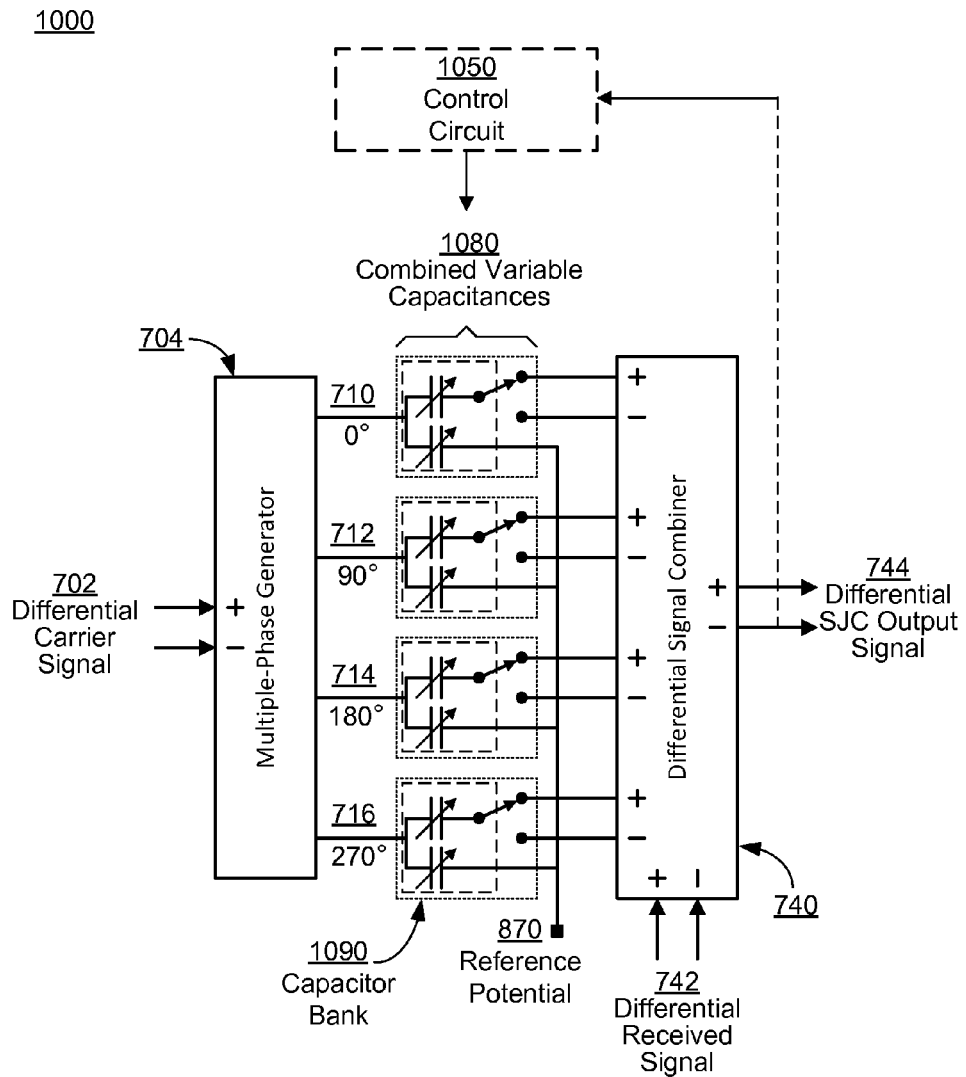
FIG. 10 is a diagram of a passive self-jammer-cancellation circuit with combined self-jammer-cancellation and load-compensation capacitances and differential interfaces, according to embodiments.

FIG. 10 is a diagram of a passive self-jammer-cancellation (SJC) circuit 1000 with combined self-jammer-cancellation and load-compensation capacitances and differential interfaces, according to embodiments. SJC circuit 1000 is similar to SJC circuit 900, with similarly-numbered elements behaving similarly. However, the variable capacitance networks in SJC circuit 1000 have combined variable capacitances 1080, formed by one or more capacitor banks such as capacitor bank 1090, that combine the functions of the variable SJC capacitances and variable load-compensation capacitances described above. Combining variable SJC and load-compensation capacitances may reduce the total number of capacitances needed to implement SJC, and may therefore reduce the circuit area required for SJC circuit 1000 compared to, for example, SJC circuit 900. For example, a capacitor bank may include multiple capacitors, each having one end coupled to an input of a variable capacitance and another end configured to be switched between coupling to two (or more) different outputs of the variable capacitance.

Combined variable capacitances 1080 are coupled to multiple-phase generator 704, differential signal combiner 740, and reference potential 870. Capacitances 1080 receive PARC signals 710-716 and output attenuated PARC signals to either side (+ or −) of the differential PARC signal inputs of differential signal combiner 740 based on control signals from control circuit 1050. In some embodiments, each of the capacitances 1080 may include a capacitor bank (e.g., capacitor bank 1090), and may provide a variable SJC capacitance by switching one of more capacitors in the capacitor bank to couple between multiple-phase generator 704 and differential signal combiner 740, and by switching one or more other capacitors in the capacitor bank to couple between multiple-phase generator 704 and reference potential 870.

Figure 11:
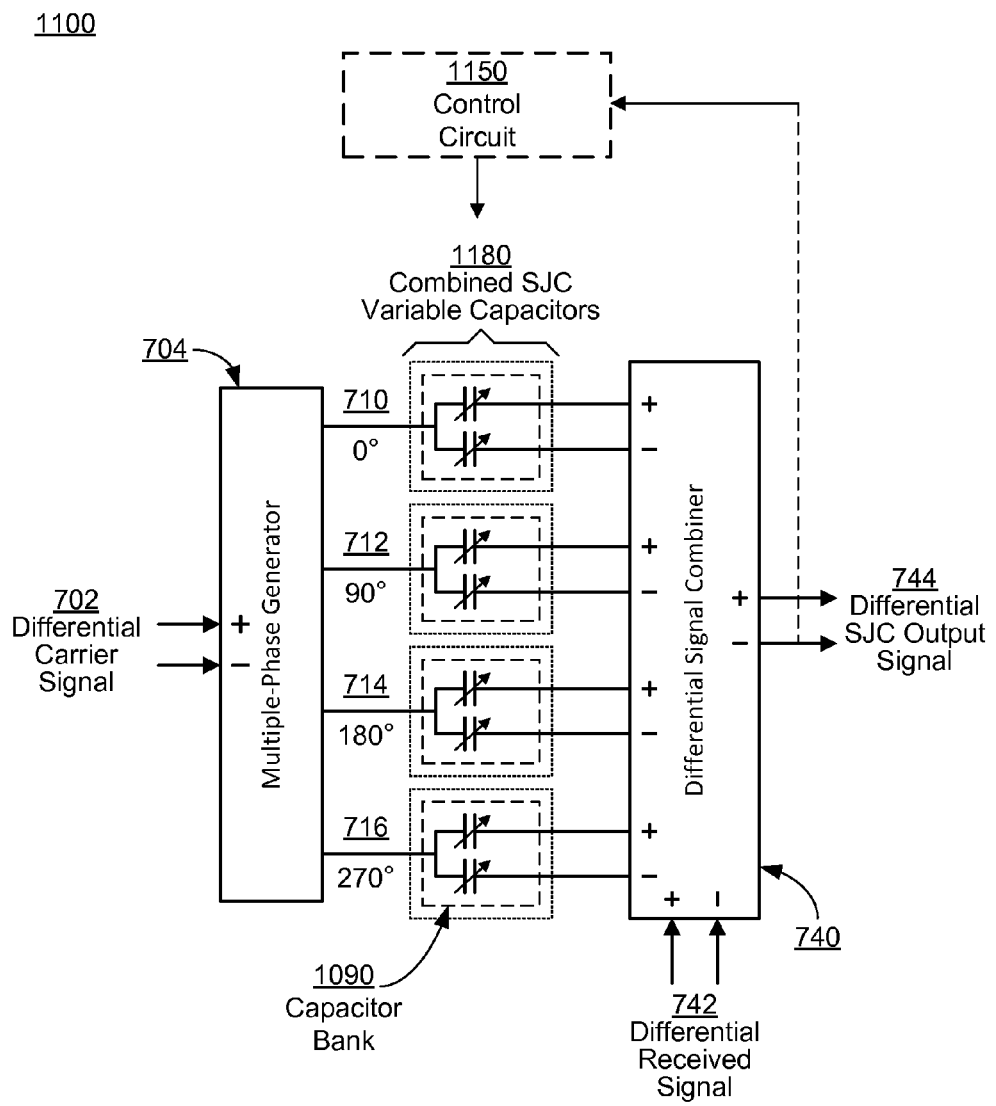
FIG. 11 is a diagram of another passive self-jammer-cancellation circuit with differential interfaces, according to embodiments.

FIG. 11 is a diagram of another passive self-jammer-cancellation (SJC) circuit 1100 with differential interfaces, according to embodiments. SJC circuit 1100 shares some similarities with SJC circuit 1000, with similarly-numbered elements behaving similarly. However, SJC circuit 1100 differs from SJC circuit 1000 in having variable capacitances 1180 that are not coupled to a reference potential. Rather, variable capacitances 1180 may be coupled to both terminals (+ and −) of the differential PARC signal inputs to differential signal combiner 740. Instead of providing an attenuated PARC signal to signal combiner 740 and shunting the complementary signal portion (in other words, the signal portion formed by removing the attenuated PARC signal from the original PARC signal) to a reference potential, each of the variable capacitances 1180 may be configured to provide two complementary PARC signals in response to control signals from control circuit 1150, where the combination of the complementary PARC signals forms the attenuated PARC signal. To present a uniform load impedance to the PARC signal outputs of the multiple-phase generator, the total capacitance of each variable capacitance network may be the same. The differential PARC signal inputs to the signal combiner respond to the difference between the two sides (+ and −) of the input. To adjust the amplitude of each PARC signal to the signal combiner the difference in the capacitance values of the two capacitances in each variable capacitance network may be varied. For example a zero amplitude PARC signal may be provided to the signal combiner by adjusting each of the two capacitances in a variable capacitance network to the same value.

Figure 12:
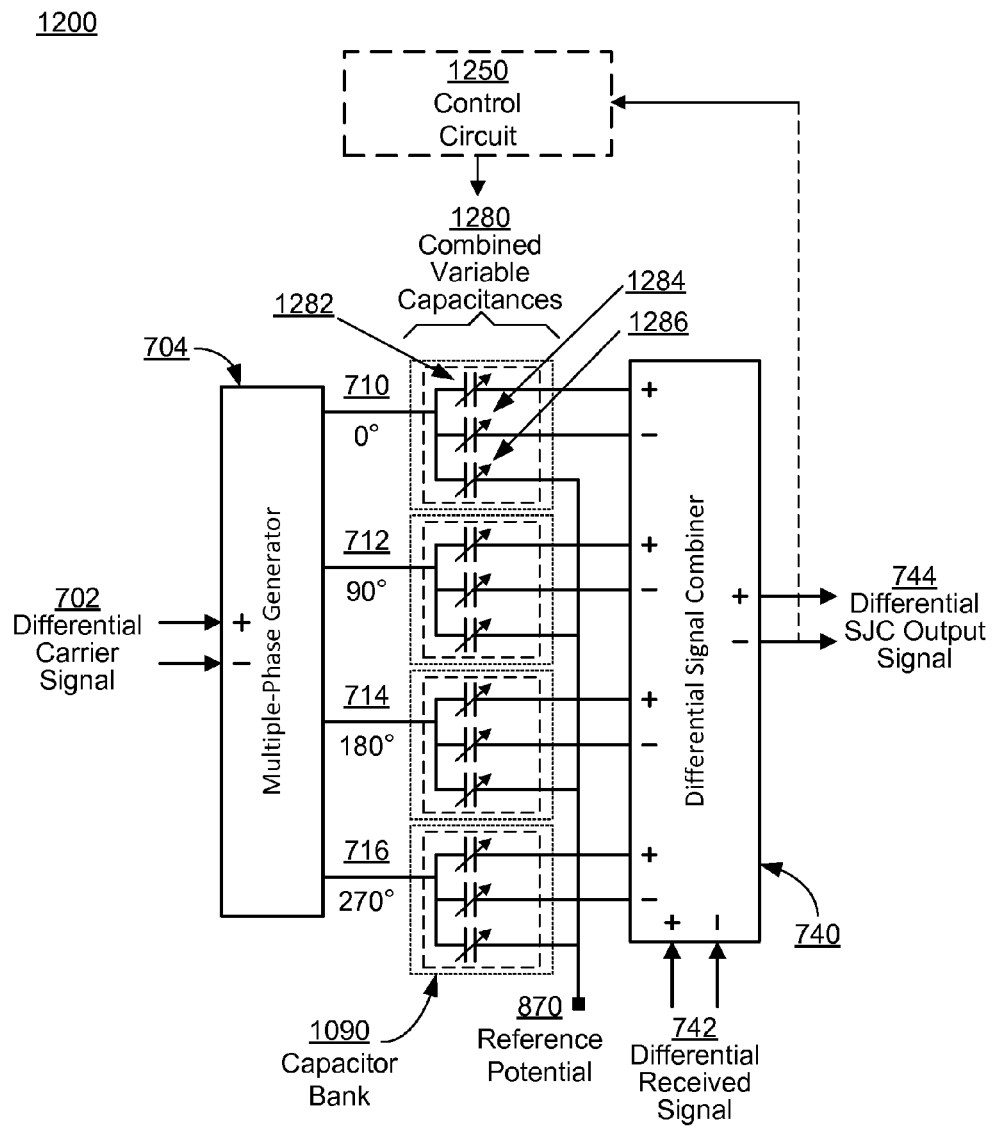
FIG. 12 is a diagram of yet another passive self-jammer-cancellation circuit with differential interfaces, according to embodiments.

FIG. 12 is a diagram of yet another passive self-jammer-cancellation (SJC) circuit 1200 with differential interfaces, according to embodiments. SJC circuit 1200 is similar to SJC circuit 1100, with similarly-numbered elements behaving similarly. SJC circuit 1200 further includes combined variable capacitances 1280 coupled to both terminals (+ and −) of the input to differential signal combiner 744, as well as to reference potential 870. Specifically, an individual combined variable capacitance may include three different variable capacitances 1282, 1284, and 1286. Variable capacitance 1282 may provide a first complementary PARC signal to the "+" terminal of differential signal combiner 744 and variable capacitance 1284 may provide a second complementary PARC signal to the "−" terminal of differential signal combiner 744, where the combination of the first and second complementary PARC signals form an attenuated PARC signal. Variable capacitance 1286 may then provide a third complementary PARC signal to reference potential 870, where the combination of the first, second, and third complementary PARC signals form the original PARC signal (e.g., PARC signal 710).

Figure 13:
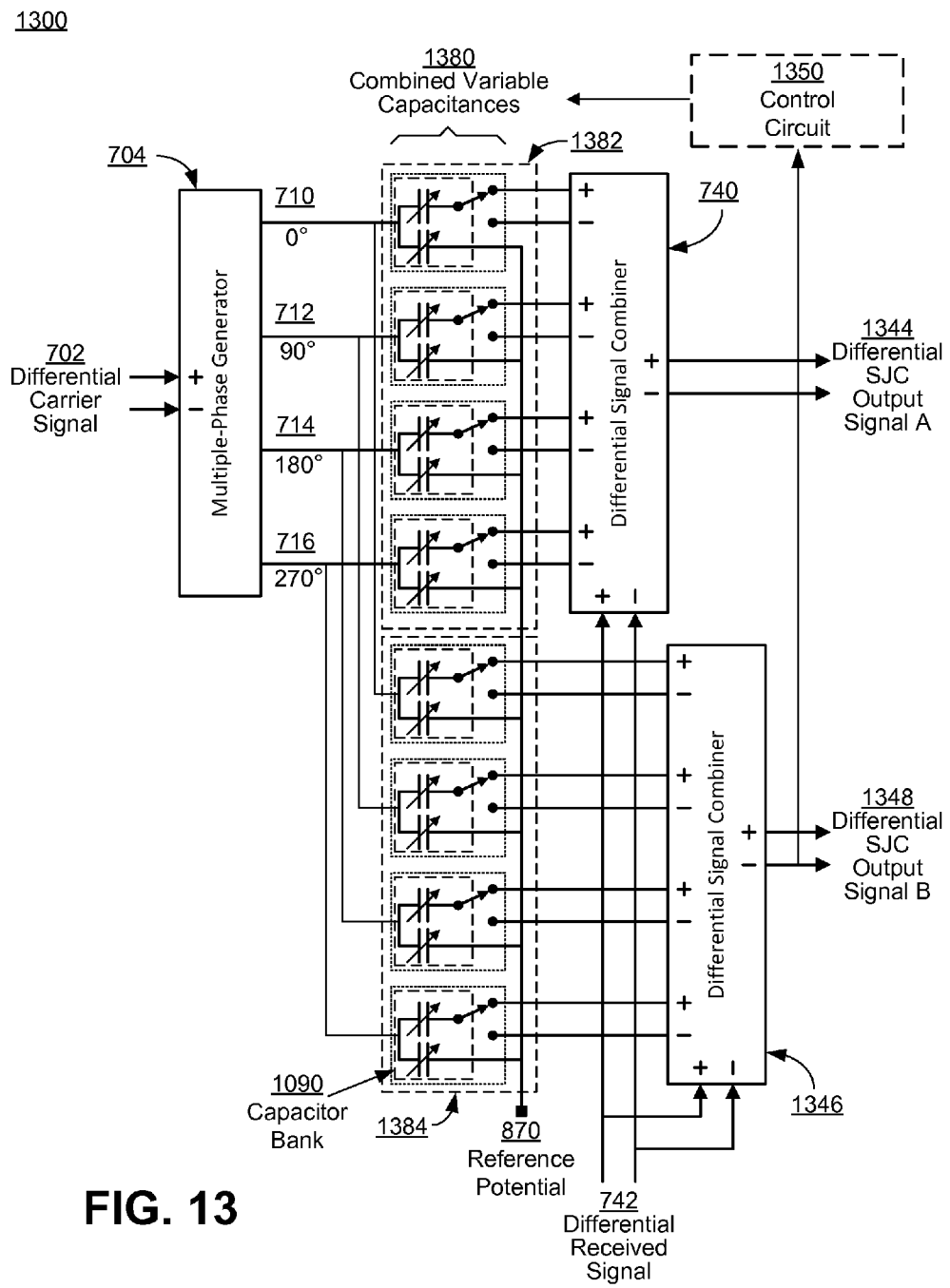
FIG. 13 is a diagram of a differential, dual-output self-jammer-cancellation circuit according to embodiments.

FIG. 13 is a diagram of a differential, dual-output self-jammer-cancellation (SJC) circuit 1300 according to embodiments. SJC circuit 1300 shares some similarities with SJC circuit 1000, with similarly-numbered elements behaving similarly. However, SJC circuit 1300 differs from SJC circuit 1000 in providing two separate outputs: differential SJC output signal A 1344 and differential SJC output signal B 1348. In some embodiments, these different outputs may be provided to different modules for subsequent processing. For example, a downstream mixer module such as mixer 638 may be implemented using separate I and Q mixers, and output signal A 1344 may be provided to the I mixer while output signal B 1348 may be provided to the Q mixer, or vice-versa.

SJC circuit 1300 may provide differential SJC output signal A 1344 by coupling PARC signals 710, 712, 714, and 716 (with relative phase offsets of 0°, 90°, 180°, and 270°, respectively) to a first subset 1382 of the combined capacitances 1380. The first subset 1382 may then output attenuated PARC signals to either side (+ or −) of the differential PARC signal inputs of differential signal combiner 740, which combines the attenuated PARC signals with differential received signal 743 to generate differential SJC output signal A 1344. SJC circuit 1300 may also provide differential SJC output signal B 1348 by coupling PARC signals 710-716 to a second subset 1384 of the combined capacitances 1380. The combined capacitances in the second subset 1384 may then output attenuated PARC signals to either side (+ or −) of the differential PARC signal inputs of differential signal combiner 1346, which combines the attenuated PARC signals from the second subset 1384 with differential received signal 742 to generate differential SJC output signal B 1348.

Figure 14:
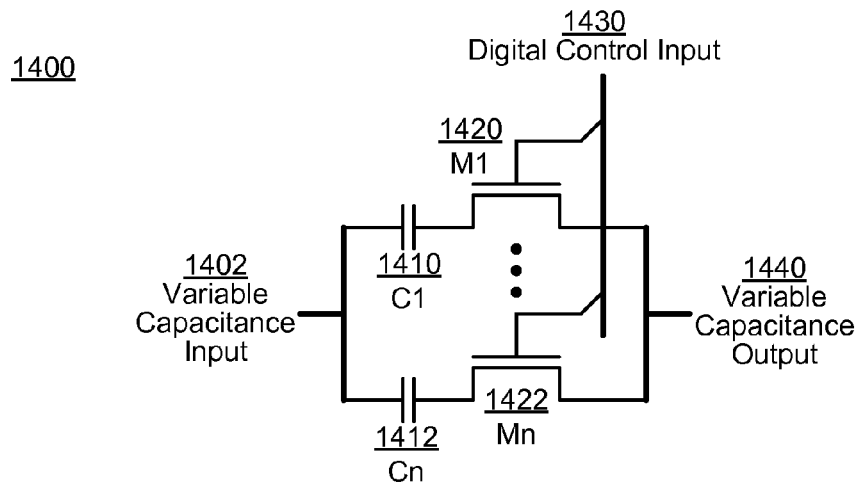
FIG. 14 depicts a variable capacitance and a dual-output variable capacitance according to embodiments.
Figure 14:
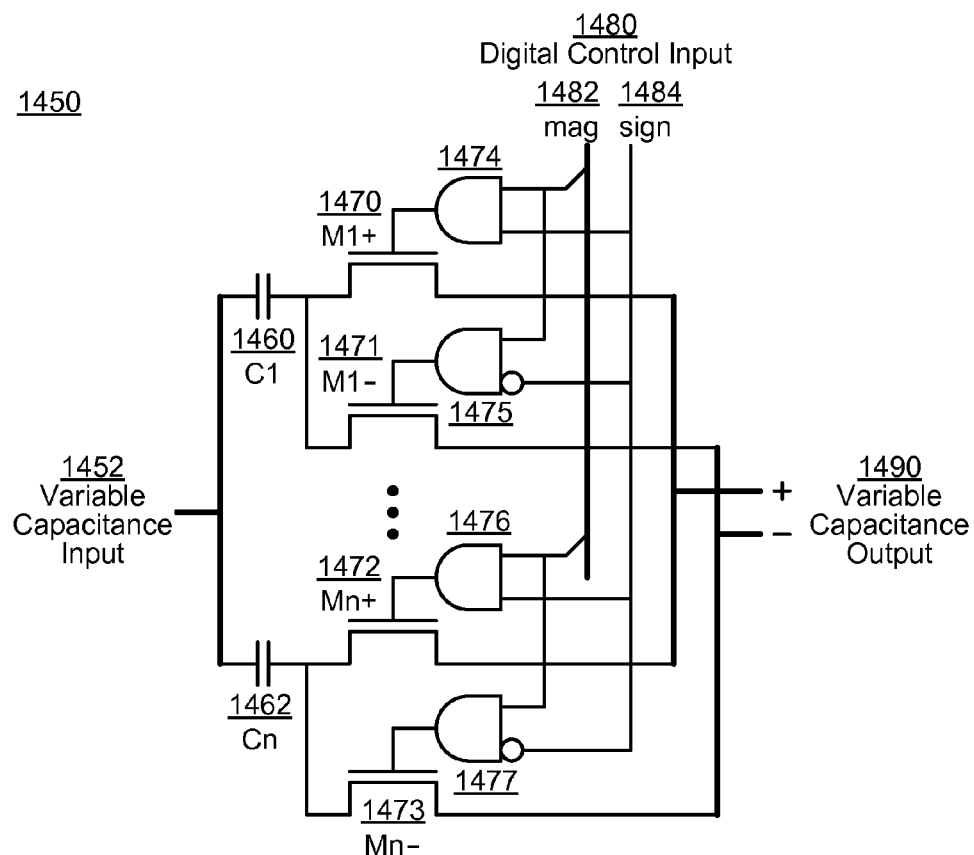

FIG. 14 depicts a variable capacitance 1400 and a dual-output variable capacitance 1450 according to embodiments. Variable capacitance 1400, which may be used as a variable SJC capacitance or a variable load-compensation capacitance, is depicted as having at least two capacitors 1410 and 1412. Each of the capacitors 1410/1412 has one end coupled to a variable capacitance input 1402. The other end of capacitor 1410 is coupled to switch 1420, and the other end of capacitor 1412 is coupled to switch 1422. In variable capacitance 1400, switches 1420 and 1422 are depicted as CMOS transistors. The drain terminals of switches 1420 and 1422 may be coupled to capacitors 1410 and 1412, respectively, while the source terminals of switches 1420 and 1422 may be coupled to variable capacitance output 1440. In some embodiments, the orientation of switches 1420 and 1422 may be reversed, with their drain terminals coupled to variable capacitance output 1440 and their source terminals coupled to capacitors 1410/1412. The gate terminals of switches 1420 and 1422 are coupled to digital control input 1430, which may include multiple digital bits and which may receive control signals from a control circuit as described above.

Dual-output variable capacitance 1450, which may be used as a dual-output variable SJC capacitance, is depicted as including at least capacitors 1460 and 1462. Each of the capacitors 1460/1462 has one end coupled to variable capacitance input 1452 and another end coupled to a pair of switches. For example, capacitor 1460 is coupled to switches 1470 and 1471, and capacitor 1462 is coupled to switches 1472 and 1473. Switches 1470-1473, depicted as CMOS transistors, may have their drain terminals coupled to their associated capacitors and their source terminals coupled to variable capacitance output 1490, or vice-versa. Variable capacitance output 1490 is a differential output with two distinct output lines, and both capacitors 1460 and 1462 are coupled to one output line via switches 1470 and 1472 and are coupled to the other output line via switches 1471 and 1473. In some embodiments, switches 1470-1473 are configured to couple capacitors 1460 and 1462 to only one output line at a given time, although in some embodiments, switches 1470-1473 may be configured to couple some capacitors to one output line and other capacitors to the other output line at a given time.

Switches 1470-1473 in turn may receive control signals from digital control input 1480. Specifically, the gate terminals of switches 1470-1473 may be coupled to one or more logic elements 1474-1477, which in turn may be coupled to a magnitude input 1482 and a sign input of digital control input 1480. In some embodiments, magnitude input 1482 controls the particular capacitors that are to be coupled to output 1490, and sign input 1484 controls the particular output line capacitors are to be coupled to. Logic elements 1474-1477 are depicted as digital AND gates (with inverters or NOT gates on one terminal of elements 1475 and 1477), but in other embodiments may be other types of logic elements, or may even be analog, depending how capacitors 1460 and 1462 are to be coupled to output 1490.

Figure 15:
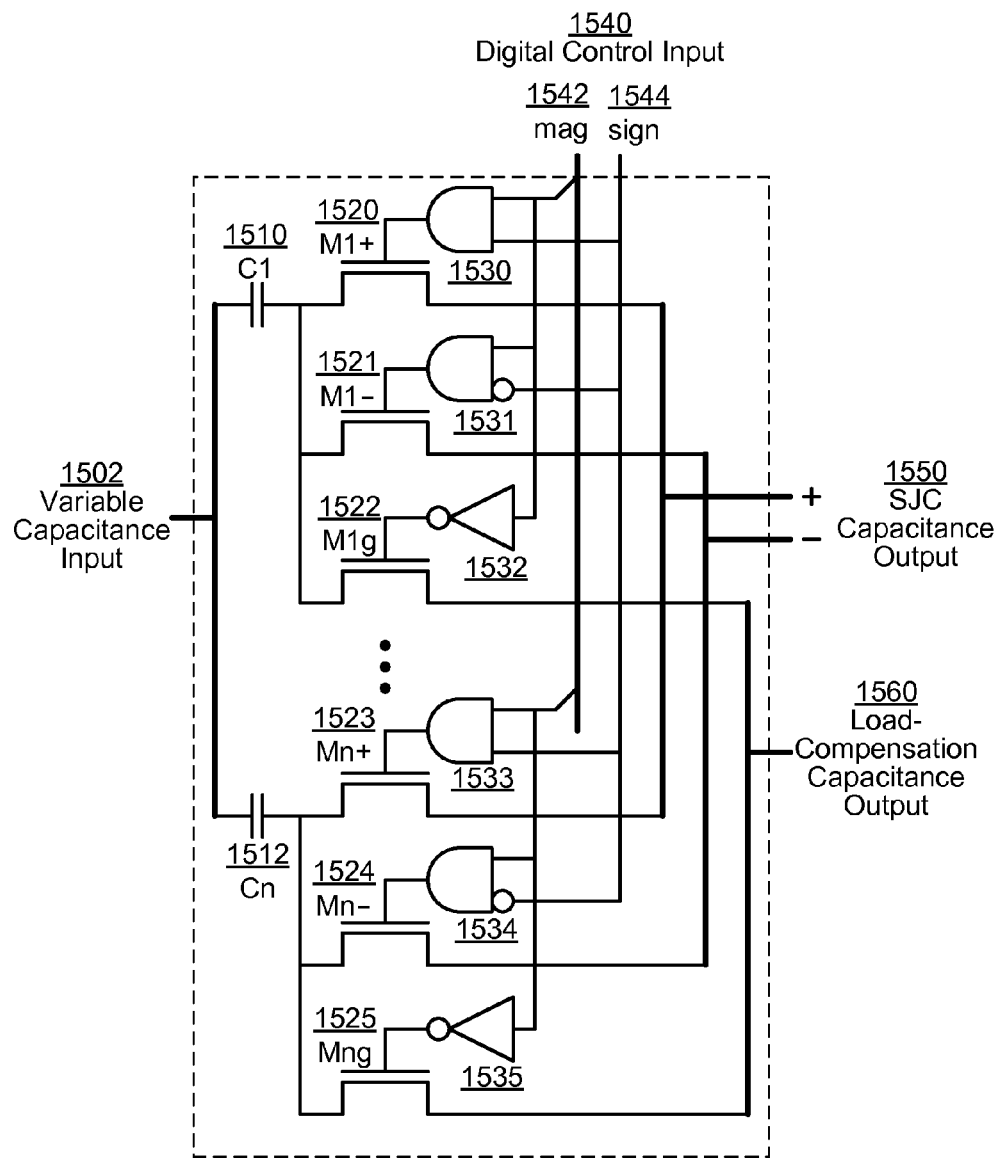
FIG. 15 depicts a combined variable capacitance according to embodiments.

FIG. 15 depicts a combined variable capacitance 1500 according to embodiments. Variable capacitance 1500, which may be used as a combined variable capacitance in the SJC circuit implementations described above, is similar to variable capacitance 1450. For example, variable capacitance 1500 includes at least two capacitors 1510 and 1512 (similar to capacitors 1460/1462) with inputs coupled to variable capacitance input 1502 and outputs coupled to switches 1520, 1521, 1523, and 1524 (similar to switches 1470-1473), which in turn are coupled to magnitude input 1542 and sign input 1544 of digital control input 1540 (similar to magnitude input 1482, sign input 1484, and digital control input 1480). Differently from variable capacitance 1450, variable capacitance 1500 includes switches 1522 and 1525 coupled to the outputs of capacitors 1510 and 1512, respectively. Switches 1522 and 1525 couple the outputs of capacitors 1510 and 1512 to load-compensation capacitance output 1560, and are coupled to magnitude input 1542 via NOT gates 1532 and 1535, respectively. In some embodiments, magnitude input 1542 may control the particular capacitors that are to be coupled to SJC capacitance output 1550. Connecting the capacitors to magnitude input 1542 may ensure that capacitors that are not selected for coupling with SJC capacitance output 1550 are instead coupled to load-compensation capacitance output 1560, thereby providing variable capacitance 1500 with a fixed, constant impedance as viewed from input 1502. Logic elements 1530-1535 depict one configuration of digital gates, but in other embodiments may be other types of logic elements, or may even be analog, depending how capacitors 1510 and 1512 are to be coupled to output 1490.

While variable capacitances 1400, 1450, and 1500 only depict two capacitors and associated switches, in other embodiments variable capacitances 1400, 1450, and 1500 may include more or fewer capacitors and their associated switches and logic elements. Similarly, while the switches in variable capacitances 1400, 1450, and 1500 are depicted as CMOS (e.g., PMOS or NMOS) transistors above, in other embodiments switches may be implemented using BJTs, MESFETs, or any other suitable switching technology. Of course, other implementations of variable capacitances may be used. In other embodiments, other impedance elements, such as transmission lines, inductors, may be used for SJC and/or load compensation.

Figure 16:
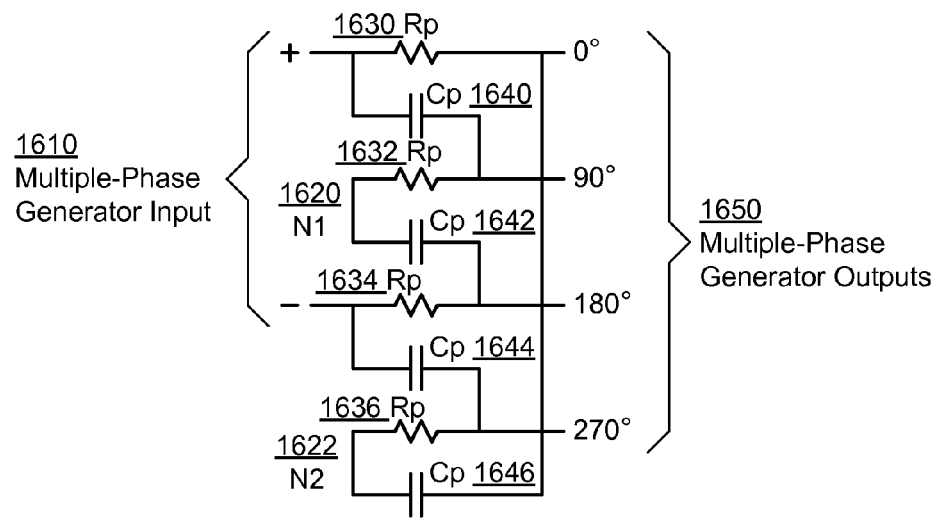
FIG. 16 depicts a multiple-phase generator according to embodiments.

FIG. 16 depicts a multiple-phase generator 1600 according to embodiments. Multi-phase generator 1600, which may be used to implement multi-phase generator 704, may be a polyphase filter that contains one or more sections, of which only one section is depicted in FIG. 16. Multi-phase generator 1600 includes a number of resistances 1630, 1632, 1634, and 1636 and capacitances 1640, 1642, 1644, and 1646 coupled to receive a differential signal from input 1610 and output four PARC signals, with relative phase-offsets of 0°, 90°, 180°, and 270° at outputs 1650. Multi-phase generator 1600 also includes nodes 1620 and 1622, which may serve as virtual reference nodes/potentials or may be coupled to the inputs 1610. If used as virtual reference nodes/potentials, nodes 1620 and 1622 may be left open or connected to another reference node/potential directly or by an impedance. If coupled to the inputs 1610, node 1620 may be coupled to the "+" input terminal and node 1622 may be coupled to the "−" input terminal Of course, in other embodiments other multiple-phase generator implementations may be used for multiple-phase generator 704.

Figure 17:
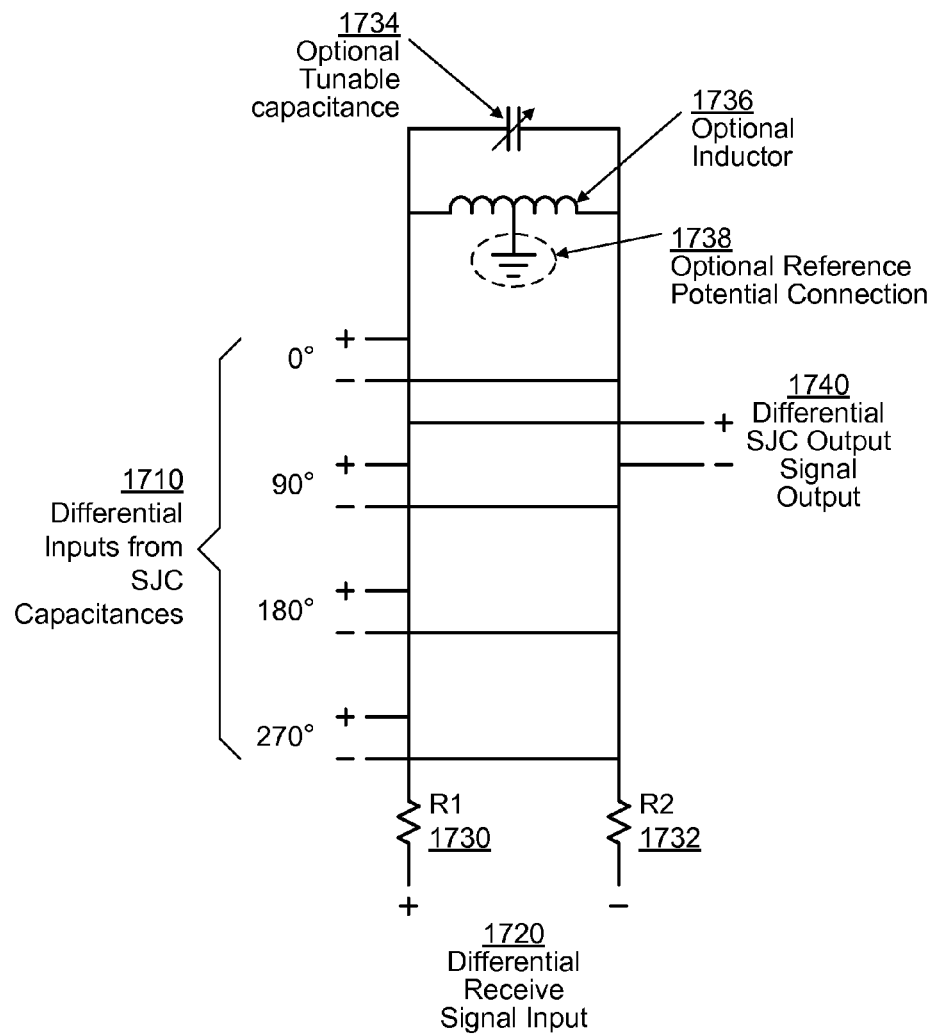
FIG. 17 depicts a differential signal combiner according to embodiments.

FIG. 17 depicts a differential signal combiner 1700 according to embodiments. Signal combiner 1700, which may be used to implement signal combiners 740/1346, is depicted in FIG. 17 as differential, although in other embodiments signal combiners may be single-ended (e.g., signal combiner 738). Signal combiner 1700 may receive input currents from SJC variable capacitances or combined variable capacitances via differential input 1710. Signal combiner 1700 may further be configured to receive a differential signal (e.g., received signal 742) on input 1720 and convert the received signal from voltage into current using resistors 1730 and 1732. Signal combiner 1710 may then sum the currents received from differential input 1710 with the converted currents from input 1720 at output 1740, resulting in an SJC output signal (e.g., SJC output signal 744, differential SJC output signal 1344, or differential SJC output signal 1348). In some embodiments, signal combiner 1700 may include optional tunable capacitance 1734, optional inductor 1736, and/or optional reference potential connection 1738. These optional elements may be used to tune signal combiner 1700 to resonate with the capacitances coupled to differential input 1710, which, when output 1740 is coupled to a low-noise amplifier (e.g., LNA module 636) may increase available bandwidth, reduce noise, and facilitate biasing of the LNA.

Figure 18:
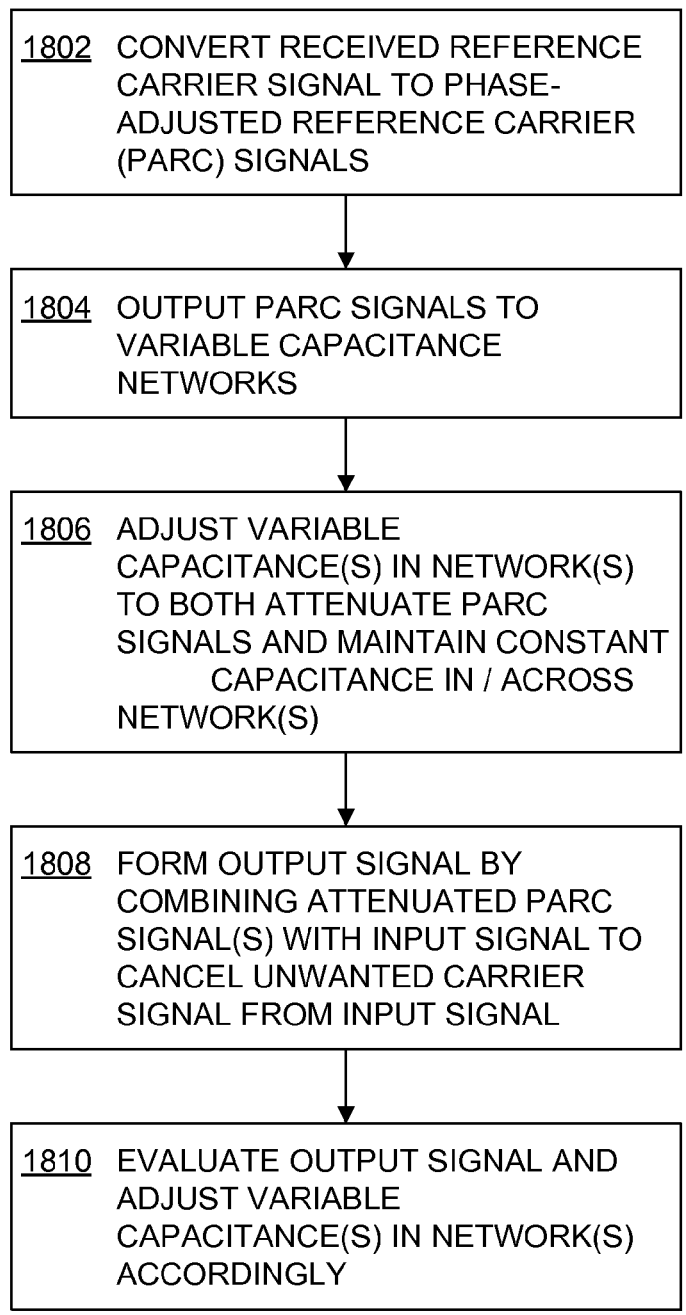
FIG. 18 is a flowchart of a process for adjusting variable impedances during self-jammer cancellation according to embodiments.

FIG. 18 is a flowchart of a process 1800 for adjusting variable impedances during self-jammer cancellation according to embodiments. Process 1800 may be performed by an SJC circuit as described herein, and may begin at step 1802, in which a multiple-phase generator may convert a received reference carrier signal to multiple phase-adjusted reference carrier (PARC) signals. At step 1804, the multiple-phase generator may output the PARC signals to one or more variable capacitance networks, each containing one or more variable capacitances. At step 1806, the SJC circuit or a control circuit associated with the SJC circuit may adjust the variable capacitances in the networks to both attenuate the received PARC signals and to maintain the capacitance of each network and/or to maintain the relationship between the capacitances of different networks. For example, if the control circuit decreases the value of one variable capacitance in a particular network, it may increase the value of another variable capacitance in that network such that the overall capacitance of that network, as seen from its input, remains constant. The control circuit may adjust the variable capacitances in the networks such that every network maintains its capacitance relationship to every other network. For example, the control circuit may adjust the variable capacitances during the SJC process such that every network has substantially the same capacitance.

At step 1808, a signal combiner may form an output signal by combining attenuated PARC signals from the variable capacitance networks with an input signal containing unwanted carrier signals and one or more signals-of-interest in order to remove the unwanted carrier signals from the input signal. At step 1810, the SJC circuit or control circuit may evaluate the output signal to determine the residual unwanted carrier signals still in the output signal and further adjust the variable capacitances to increase the removal of unwanted carrier signals in the output signal.

The operations described in process 1800 are for illustrative purposes only. These operations may be implemented using additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

I claim:

1. A self-jammer-cancellation (SJC) module configured to remove an unwanted carrier signal (UCS) from a signal-of-interest (SOI), the SJC module comprising:
   a multi-phase generator (MPG) configured to:
      receive a reference carrier signal; and
      provide a plurality of phase-adjusted reference carrier (PARC) signals;
   a plurality of variable-capacitance networks, each comprising an input, a first output, a first variable capacitance coupled from the input to the first output, and a second variable capacitance coupled to the input, each variable-capacitance network configured to:
      receive one of the plurality of PARC signals at the input,
      attenuate the PARC signal by adjusting the first variable capacitance,
      provide the attenuated PARC signal to the first output, and
      adjust the second variable capacitance such that a sum of the first and second capacitance values is substantially constant; and
   a signal combiner (SC) configured to:
      receive attenuated PARC signals from the variable-capacitance networks;
      receive a mixed signal comprising the SOI and the UCS; and
      combine the mixed signal with the attenuated PARC signals to provide an SJC output signal in which an amplitude ratio between the UCS and the SOI is substantially reduced relative to another amplitude ratio between the UCS and the SOI in the mixed signal.

2. The SJC module of claim further comprising a processor block configured to:
   determine a residual UCS component in the SJC output signal, and
   adjust the variable-capacitance networks to reduce the residual UCS component.

3. The SJC module of claim 2, wherein at least one of the variable-capacitance networks includes a capacitor bank containing a plurality of capacitance elements configured to be switched between the first variable capacitance and the second variable capacitance.

4. The SJC module f claim 2, wherein the second variable capacitance is coupled to a reference node.

5. The SJC module of claim 4, wherein an input of the SC presents as a virtual ground and the reference node is at least one of a ground, an radio frequency ground, and a virtual ground.

6. The SJC module of claim 2, wherein;
   the second variable capacitance is coupled to a second output; and
   the first and second outputs from the variable capacitance networks are coupled to the SC.

7. The SJC module of claim 2, wherein at least one of the reference carrier signal, the mixed signal, and the SJC output signal is a differential signal.

8. A method to remove an unwanted carrier signal (UCS) from a signal-of-interest (SOI) in a self-jammer-cancellation (SJC) module, the method comprising:
   receiving a plurality of phase-adjusted reference carrier (PARC) signals from a plurality of inputs, each of the PARC signals received from a respective input,
   adjusting a plurality of variable capacitance networks coupled to receive the PARC signals to attenuate at least one of the PARC signals such that each of the variable capacitance networks presents substantially the same impedance to the plurality of inputs;
   receiving a mixed signal comprising the SOI and the UCS; and
   combining the at least one attenuated PARC signal with the mixed signal to provide an SJC output signal in which an amplitude ratio of the UCS to the 501 is substantially reduced relative to another amplitude ratio of the UCS to the SOI in the mixed signal.

9. The method of claim 8, further comprising determining a residual UCS component in the SJC output signal and adjusting the variable-capacitance networks to reduce the residual UCS component.

10. The method of claim 9, wherein at least one of the plurality of variable capacitance networks is coupled to a reference node.

11. The method of claim 10, wherein at least one of the variable-capacitance networks includes a capacitor bank containing a plurality of capacitance elements and adjusting the variable-capacitance networks comprises switching at least one of the capacitance elements between coupling, to the reference node and providing the at least one attenuated PARC signal.

12. The method of claim 9, wherein at least one of the variable-capacitance networks is further configured to provide a first portion of the PARC signal as at least one of the attenuated PARC signals and a second portion of the PARC signal as another one of the attenuated PARC signals.

13. The method of claim 9, wherein at least one of the mixed signal and the SSC output signal is a differential signal.

14. A self-jammer-cancellation (SJC) module configured to remove an unwanted carrier signal (UCS) from a signal-of-interest (SOI), the SJC module comprising:
   a multi-phase generator (MPG) configured to:
      receive a reference carrier signal; and
      provide a plurality of phase-adjusted reference carrier (PARC) signals;
   a plurality of variable-capacitance networks, each comprising an input, a first output, a first variable capacitance coupled from the input to the first output, and a second variable capacitance coupled to the input, each variable-capacitance network configured to:
      receive one of the plurality of PARC signals at the input,
      attenuate the PARC signal by adjusting the first variable capacitance,
      provide the attenuated PARC signal to the first output, and
      adjust the second variable capacitance such that the combined impedance of the variable-capacitance network seen by the MPG is substantially constant; and
   a signal combiner (SC) configured to:
      receive attenuated PARC signals from the variable-capacitance networks;
      receive a mixed signal comprising the SOI and the UCS; and combine the mixed signal with the attenuated PARC signals to provide an SJC output signal in which an amplitude ratio between the UCS and the SOI is substantially reduced relative to another amplitude ratio between the UCS and the SOI in the mixed signal.

15. The SJC module of claim 14, further comprising a processor block configured to:
determine a residual UCS component in the SJC output signal, and
adjust the variable-capacitance networks to reduce the residual UCS component.

16. The SJC module of claim 15, wherein at least one of the variable-capacitance networks includes a capacitor bank containing a plurality of capacitance elements configured to be switched between the first variable capacitance and the second variable capacitance.

17. The SJC module of claim 15, wherein the second variable capacitance is coupled to a reference node.

18. The SJC module of claim 17, wherein an input of the SC presents as a virtual ground and the reference node is at least one of a ground, an radio-frequency ground, and a virtual ground.

19. The SJC module of claim 18, wherein:
one of the first variable capacitance and the second variable capacitance is coupled to as second output; and
the first and second outputs from the variable capacitance networks are coupled to the SC.

20. The SJC module of claim 18, wherein at least one of the reference carrier signal, the mixed signal, and the SiC output signal is a differential signal.

* * * * *